: US008191870B2

(12) United States Patent
Nieuwoudt et al.

(10) Patent No.: US 8,191,870 B2
(45) Date of Patent: Jun. 5, 2012

(54) CROSS-FLOW TRAY AND METHOD EMPLOYING SAME

(75) Inventors: Izak Nieuwoudt, Wichita, KS (US); Charles A. Griesel, Bel Aire, KS (US)

(73) Assignee: Koch-Glitsch, LP, Wichita, KS (US)

( * ) Notice: Subject to any disclaimer, the term of this patent is extended or adjusted under 35 U.S.C. 154(b) by 548 days.

(21) Appl. No.: 12/539,448

(22) Filed: Aug. 11, 2009

(65) Prior Publication Data

US 2010/0039881 A1 Feb. 18, 2010

Related U.S. Application Data

(60) Provisional application No. 61/088,588, filed on Aug. 13, 2008.

(51) Int. Cl.
*B01F 3/04* (2006.01)
(52) U.S. Cl. ........... 261/114.5; 55/347; 55/348; 55/396; 55/457
(58) Field of Classification Search ............... 261/114.2, 261/114.4, 114.5; 55/347, 348, 396, 457
See application file for complete search history.

(56) References Cited

U.S. PATENT DOCUMENTS

| 2,808,897 | A | 10/1957 | Reinsch et al. |
|---|---|---|---|
| 3,864,439 | A | 2/1975 | Tanigawa et al. |
| 4,349,360 | A | 9/1982 | Schuurmans et al. |
| 5,098,615 | A | 3/1992 | Resetarits |
| 5,626,799 | A | 5/1997 | Sheinman |
| 5,837,105 | A | 11/1998 | Stober et al. |
| 6,105,941 | A | 8/2000 | Buchanan et al. |
| 6,221,133 | B1 | 4/2001 | Moore |
| 6,227,524 | B1 | 5/2001 | Kiselev et al. |
| 2004/0104493 | A1 | 6/2004 | Buchanan et al. |
| 2004/0195706 | A1 | 10/2004 | Konijn |
| 2008/0142355 | A1 | 6/2008 | Xu et al. |

FOREIGN PATENT DOCUMENTS

| EP | 0 381 388 A2 | 8/1990 |
|---|---|---|
| WO | 99/24135 | 5/1999 |

OTHER PUBLICATIONS

International Search Report and Written Opinion in International Application No. PCT/US2009/053555; Filed: Aug. 12, 2009 Applicant: Koch-Glitsch, LP et al.
Soviet Inventions Illustrated, Week 197841, (Nov. 29, 1977), Derwent Publications Ltd., London, GB: AN 1978-739484'41! XP002295614.

*Primary Examiner* — Robert A Hopkins
(74) *Attorney, Agent, or Firm* — Hovey Williams LLP

(57) ABSTRACT

A cross-flow tray is provided with a tray deck and groupings of cans separated by weirs. The cans have walls that surround vapor openings in the tray deck. Openings are provided in the walls to allow liquid to enter the cans from the tray deck. Additional openings are provided in the walls to allow liquid to exit the cans. Swirlers positioned within the cans induce a centrifugal swirling motion to the vapor and liquid to facilitate mass transfer and/or heat exchange between the vapor and liquid within the cans.

25 Claims, 6 Drawing Sheets

CROSS-FLOW TRAY AND METHOD EMPLOYING SAME

BACKGROUND OF THE INVENTION

The present invention relates to columns in which mass transfer and/or heat transfer between fluid streams occurs and, more particularly, to cross-flow trays used in such columns and methods of effecting mass transfer and/or heat transfer using such trays.

Various types of cross-flow trays have been developed to facilitate contact and thus increase the mass transfer and/or heat exchange between fluid streams flowing within processing columns. A plurality of such trays are normally used within the open internal region of such columns, with each tray extending horizontally across the cross section of the column and adjacent trays being vertically spaced apart. The trays include a deck surface in which a plurality of openings are provided to allow an ascending fluid stream, typically a vapor stream, to pass through the tray deck and interact with a liquid stream flowing horizontally across the deck surface. The deck surface that contains these openings is generally referred to as an active area. The vapor-liquid interaction that occurs on this active area of the deck surface forms a froth that facilitates the desired mass transfer and/or heat exchange between the liquid and vapor streams.

These vapor-liquid cross-flow trays also typically include larger openings and associated structures known as downcomers that allow the liquid stream to be removed from the deck surface on one tray and directed to an inlet area on the deck surface of an underlying tray. The inlet area is normally imperforate to prevent liquid from descending through the deck surface without first traveling across the active area and to also prevent vapor from ascending through the downcomer. In one design known as a single pass arrangement, the inlet area that receives liquid discharged from an overlying downcomer and the opening or inlet for the downcomer that removes the liquid from the tray are positioned at opposite ends of each tray. In a two-pass arrangement, a single downcomer is centrally positioned on one tray and two downcomers are positioned at opposite ends of the underlying tray. Multiple-pass downcomer arrangements are also utilized.

Vapor-liquid cross-flow trays which use a plurality of cylindrical cans have been developed for high flow capacity and high efficiency applications. The cylindrical cans extend upwardly from the deck surface and surround vapor openings formed in the deck surface. A swirling motion is imparted to vapor ascending within the can using swirl vanes positioned within the cans. Liquid flowing on the deck surface is introduced into the cans through slots or other openings positioned in the lower portion of the can wall. One or more downcomers are positioned on each tray to remove liquid from one tray and deliver it to an underlying tray.

The swirling vapor ascends through these cans and interacts with the liquid entering the cans from the deck surface to cause vigorous vapor-liquid interaction that leads to high separation efficiency. The swirling vapor also causes a large portion of the liquid to be splashed against the inner wall surface of each can, where it passes through vertical and horizontal slots in the can wall. After passing through these slots, the liquid descends to the deck surface and then travels along the deck surface to one or more downcomers for passage to an underlying tray. The vapor exits an open top or other openings provided in each can and then flows upwardly through the vapor openings and the cans provided on the deck surface of the overlying tray.

One problem with the high capacity trays discussed above is that the liquid on the deck surface is uniformly distributed to each of the cans. At low liquid flow rates, the quantity of liquid presented to each can is such that it becomes readily entrained in the vapor stream and forms a spray which diminishes the separation efficiency of the tray.

Another problem associated with the design of these high capacity trays is the tendency of the liquid to be recycled to each can rather than flowing in the desired plug flow pattern across the tray.

A need has thus developed for an improved tray design that overcomes the problems described above.

SUMMARY OF THE INVENTION

In one aspect, the present invention is directed to a cross-flow tray for use in a column to facilitate mass transfer and/or heat exchange between fluid streams in the column. The tray comprises a generally planar tray deck and a downcomer having an inlet opening on the tray deck for removing liquid from the tray deck. A plurality of vapor openings positioned in the tray deck allows the upward passage of vapor through the tray deck. A plurality of cans are positioned on the tray deck and have walls surrounding the vapor openings. Inlet openings are positioned in the walls of the cans for allowing liquid to enter the cans from the tray deck. Discharge openings are placed in the walls of said cans to permit liquid to exit the cans after interacting with vapor within the cans. A weir is positioned between a first group of cans in a first zone on the tray deck and a second group of said cans in a second zone on the tray deck. The weir serves to cause liquid to be delivered to the cans in the first group of cans before being delivered to the second group of cans, thereby reducing the opportunity for undesirable entrainment of the liquid in the vapor at low liquid flow rates. The discharge openings are also positioned predominantly or entirely on a downstream side of the cans so that liquid exiting through the discharge openings is carried over the weir and onto the tray deck in the second zone, thereby reducing the opportunity for liquid to be recirculated to the cans from which it exited. Splash walls extending between adjacent cans within each group of cans are also used to reduce the opportunity for recirculation of the liquid.

In another aspect, the invention is directed to a column for facilitating mass transfer and/or heat exchange between fluid streams flowing within the column. The column comprises an upright shell defining an open interior region and a plurality of cross-flow trays of the type described above positioned in vertically spaced apart relationship in the open interior region of the shell.

In a further aspect, the present invention is directed to a method of using the cross-flow tray described above to facilitate mass transfer and/or heat exchange between fluid streams in the column. The method comprises the steps of introducing liquid onto the inlet area of the tray deck and causing the liquid to flow in a downstream direction on said tray deck. The weir is used to cause liquid to accumulate on the tray deck in the first zone until it reaches a level sufficient to enter the first group of cans in the first zone through the inlet openings provided in the walls of said first group of cans. The liquid entering the first group of cans is mixed with swirling vapor rising within said cans to cause mass and/or heat exchange between the liquid and vapor. The liquid that has mixed with the vapor within the first group of cans exits the cans through the discharge openings provided in the walls of the first group of cans. Because the discharge openings are positioned predominantly or entirely facing in the downstream direction and splash walls are positioned between adjacent cans, most or all of the exiting liquid is directed over the weir before it descends onto the tray deck in the second zone. The liquid then accumulates on the tray deck in the second zone until it reaches a level sufficient to enter the second group of cans in the second zone through the inlet openings provided in the walls of the second group of cans. The liquid entering the second group of cans is mixed with swirling vapor rising within the cans to cause mass and/or heat exchange between the liquid and vapor. The liquid is then removed from the second group of cans through discharge openings provided in the walls of the second group of cans and may be directed to additional groupings of cans in the manner described above or it may be delivered directly to a downcomer for delivery to an underlying tray.

BRIEF DESCRIPTION OF THE DRAWINGS

In the accompanying drawings which form part of the specification and are to be read in conjunction therewith and in which like reference numerals are used to indicate like parts in the various views.

DETAILED DESCRIPTION OF THE INVENTION

Figure 1:
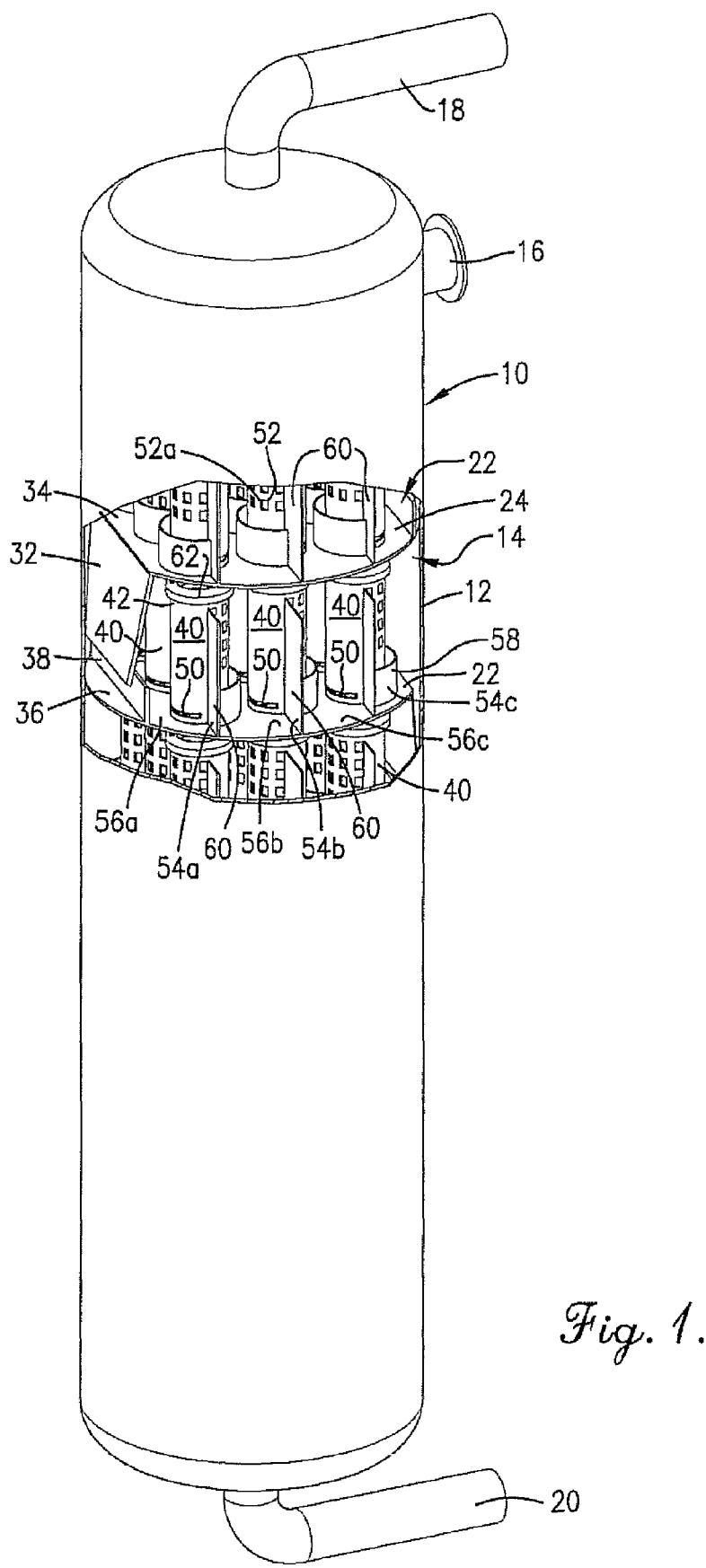
FIG. 1 is a perspective view of a column with portions of the column shell being broken away to illustrate the cross-flow trays of the present invention positioned within an open internal area of the column.
Figure 2:
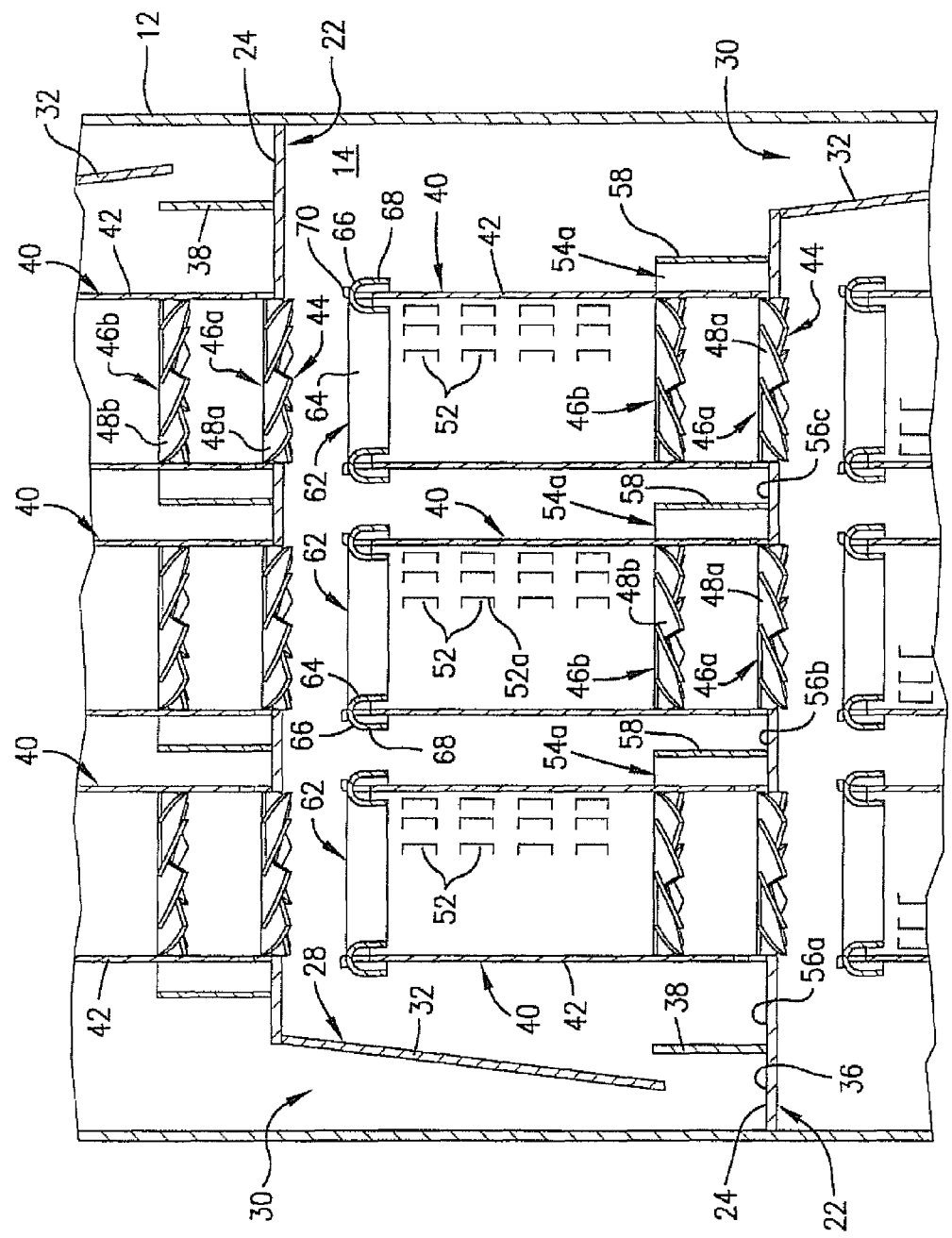
FIG. 2 is a fragmentary side elevation view of the column taken in vertical section and shown on an enlarged scale.

Turning now to the drawings in greater detail and initially to FIG. 1, a column suitable for use in mass transfer and heat exchange processes is represented generally by the numeral 10. Column 10 includes an upright, external shell 12 that is generally cylindrical in configuration, although other configurations, including polygonal, are possible and are within the scope of the present invention. Shell 12 is of any suitable diameter and height and is constructed from one or more rigid materials that are desirably inert to, or are otherwise compatible with, the fluids and conditions present during operation of the column 10.

Column 10 is of a type used for processing fluid streams, typically liquid and vapor streams, to obtain fractionation products and/or to otherwise cause mass transfer and/or heat exchange between the fluid streams. The shell 12 of the column 10 defines an open internal region 14 in which the desired mass transfer and/or heat exchange between the fluid streams occurs. Normally, the fluid streams comprise one or more ascending vapor streams and one or more descending liquid streams. Alternatively, the fluid streams may comprise both ascending and descending liquid streams or an ascending gas stream and a descending liquid stream.

The fluid streams are directed to the column 10 through any number of feed lines 16 positioned at appropriate locations along the height of the column 10. One or more vapor streams can also be generated within the column 10 rather than being introduced into the column 10 through the feed lines. The column 10 will also typically include an overhead line 18 for removing a vapor product or byproduct and a bottom stream takeoff line 20 for removing a liquid product or byproduct from the column 10. Other column components that are typically present, such as reflux stream lines, reboilers, condensers, vapor horns, and the like, are not illustrated in the drawings because they are conventional in nature and an illustration of these components is not believed to be necessary for an understanding of the present invention.

Turning additionally to FIGS. 2-6, in accordance with the present invention, a plurality of horizontally extending cross-flow trays 22 are positioned in vertically spaced relationship within the open internal region 14 of the column 10. The trays 22 include a deck 24 which is normally constructed from a number of individual panels which can be joined together in any of various known fashions. Each tray 22 includes at least one downcomer 28 having an inlet 30 formed by an opening in the deck 24 and one or more walls 32 that form a passageway for delivering liquid to an underlying tray 22. In the illustrated embodiment, the shell 12 of the column 10 forms one of the walls 32 of the downcomer 28. In other embodiments, the shell 12 need not form part of the downcomer 28.

In the illustrated embodiment, each tray 22 has a downcomer 28 positioned at one end of the deck 24 and the downcomers 28 on adjacent trays 22 are positioned at opposite ends of the trays 22. The deck 24 of each tray 22 further includes an inlet area 36 which underlies the downcomer 28 of the overlying tray 22 so that liquid discharged from the overlying downcomer 28 is directed onto the inlet area 36 and then flows in a downstream direction across the tray deck 24 to the downcomer 28. An optional inlet weir 38 in the form of an upright wall extending upwardly from the deck 24 may be positioned adjacent the inlet area 36 to cause liquid to accumulate on the inlet area 36 to a level corresponding to the height of the inlet weir 38 before it overflows the inlet weir 38 and travels along that portion of the deck 24 located in the downstream flow direction from the inlet weir 38. In the illustrated single-pass arrangement, the inlet area 36 and the downcomer inlet 30 are located at opposite ends on each tray 22. It will be appreciated that the present invention is also applicable to two-pass or multiple-pass arrangements.

Each of the trays 22 includes a plurality of uniformly spaced apart cans 40 that extend upwardly from and are supported on the deck 24. The cans 40 are preferably laid out in a preselected uniform pattern on the deck 24, such as in a triangular or square pitch. Each can 40 is formed by a wall 42 that is generally cylindrical, although other configurations could be used. In one embodiment, the walls 42 have a height which is less than the vertical spacing between the adjacent trays 22 so that the top edge of each wall 42 is spaced a preselected distance below the overlying tray 22. In other embodiments, the walls 42 may extend upwardly to contact and support the overlying tray 22. If the walls 42 contact the overlying tray 22 and surround the vapor opening 44 in the deck 24 of the overlying tray 22, suitable openings are placed in the upper portions of the walls 42 to permit vapor to enter the cans 40 from the surrounding volume and ascend through the vapor opening 44 in the deck 24 of the overlying tray 22. Similarly, if the walls 42 contact the overlying tray 22 but are offset from the vapor openings 44 in the deck 24 of the overlying tray 22, openings are placed in the upper portions of the walls 42 to permit vapor to exit the cans 40 and ascend through the vapor openings 44 in the overlying tray 22. The bottom edges of the walls 42 are secured to the deck 24 in any suitable manner, such as by welding or by tabs that extend downwardly from the bottom edge of the wall 42 and are inserted through slots formed in the deck 24. The tabs may then be bent against the underside of the deck 24 to secure the can 40 to the deck 24.

The wall 42 of each can 40 surrounds a vapor opening 44 provided in the deck 24 that allows vapor to pass upwardly through the deck 24 and into the associated can 40. Each vapor opening 44 normally has a diameter slightly less than the inner diameter of the wall 42 so that all of the vapor that passes upwardly through the deck 24 passes through the cans 40. Rather than using a single larger opening 44 to feed vapor to each can 40, a plurality of smaller openings 44 may be used. The number and diameter of the cans 40 and the size of the openings 44 are selected to provide the desired vapor flow capacity and the desired volume for the intended vapor-liquid interaction.

One or more sets of swirlers 46 are positioned to cause centrifugal swirling of the vapor within each can 40. One set of swirlers 46a is normally positioned in each vapor opening 44 in the plane of the deck 24 so that a swirling motion is induced in the vapor as it passes upwardly through the deck 24 and enters the cans 40. Another set of swirlers 46b may be located within each can 40 at a location spaced a preselected distance above the swirlers 46a positioned within in the plane of the deck 24. Each set of swirlers 46 comprises a plurality of radially extending planar or curved vanes 48. The vanes 48a in the lower set of swirlers 46a may be shaped and/or angled the same or differently from the vanes 48b in the upper set of swirlers 46b. As one example, the lower vanes 48a may be curved to provide a gradual transition for the vapor from a vertical flow direction to one with a substantial radial flow vector. Because the upper vanes 48b are presented with vapor flowing with the radial flow vector, the upper vanes 48b may be planar or have less of a curve in comparison to the lower vanes 48a.

The swirlers 46 may be arranged so that the vapor swirls in the same rotational direction in each can 40 on the tray deck 24. Alternatively, the direction of rotation in some cans 40 may be different from that of other cans 40.

Liquid on the tray deck 24 enters the cans 40 through inlet openings 50 such as slots positioned in the wall 42 of each can 40. The inlet openings 50 are sized and positioned in the wall 42 to allow the desired inflow of liquid into each can 40 while at the same time ensuring that the can 40 retains the desired structural rigidity. The inlet openings 50 are normally placed a preselected distance above the plane of the tray deck 24 so that liquid must accumulate to a preselected depth on the tray deck 24 surrounding the cans 40 before entering the inlet openings 50 in the walls 42 of the cans 40. The inlet openings 50 are sized to permit the desired volumetric flow of liquid into each can 40 and are desirably positioned above the lower set of swirlers 46a so that as liquid enters the can 40 it encounters vapor which is already moving with a swirling motion. The swirling vapor and liquid then ascend within the can in a mixing zone where intense interaction of, and mass transfer and/or heat exchange, occurs between the vapor and liquid. The upper sets of swirlers 46b, if used, are positioned above the plane of the inlet openings 50 in the mixing zone to cause additional swirling of the vapor and liquid.

As the swirling vapor and liquid ascend within cans 40, the greater momentum of the liquid causes a large portion of the liquid to be thrown against the inner surface of the wall 42 of each can 40. The liquid then rises up the wall 42 and exits the can 40 through discharge openings 52 in the wall 42. The discharge openings 52 can be in various forms, such as simple holes. In the embodiment illustrated in FIGS. 1-5, the discharge openings 52 are in the form of directional louvers 52a that extend inwardly into the associated can 40 and are oriented to capture the liquid traveling up the wall 42 of the can 40. In another embodiment illustrated in FIG. 6, the discharge openings 52 are in the form of outwardly bent tabs 52b that are angled downwardly to deflect exiting liquid in a downward direction toward the tray deck 24. Other embodiments of the discharge openings 52 are contemplated by and are within the scope of the present invention.

In order to ensure a more uniform flow of the liquid across the tray deck 24 from the inlet area 36 to the downcomer 28, a series of intermediate weirs 54a, 54b, and 54c are positioned on the tray deck 24. The weirs 54a-c are arranged generally transverse to the overall direction of liquid flow across the tray deck 24 and are positioned in spaced apart relationship. The weirs 54a-c thus serve to divide the tray deck 24 into multiple zones 56a-c, each zone containing a group of the cans 40. The number of cans 40 in each group of cans 40 is normally the same in each zone 56a-c, but in some applications it may be desirable to include more cans 40 in some zones than others. While three zones 56a-c are illustrated, it is to be understood that two or more zones can be provided by using one or any multiple number of weirs.

In addition to achieving a more uniform liquid flow, the weirs 54a-c serve to force the liquid into the cans 40 positioned in the zone 56a-c immediately upstream from each weir 54a-c. The liquid must accumulate on the tray deck 24 to the height of the weir 54a, 54b, or 54c before spilling over the weir and entering the next zone 56b or 56c. The weirs 54a-c are each preferably of a height such that their tipper edge is above the level of the inlet openings 50 in the walls 42 of the cans 40 and below the level of the lowermost discharge openings 52. The weirs 54a-c may each be of the same height or, alternatively, the weirs may increase or decrease in height in the direction of liquid flow across the tray deck 24. The presence of the weirs 54a-c allows liquid to be uniformly distributed within each zone 56a-c so that generally the same quantity of liquid is presented to each can 40 located within a particular zone 54a, 54b, or 54c. Because the liquid is initially distributed only to the cans 40 in zone 56a, rather than to all of the cans on the tray deck 24, the liquid at low flow rates is less likely to become entrained in the vapor stream and carried to the overlying tray 22. Instead, the liquid is more likely to flow across the associated tray deck 24 for interaction with the vapor streams in the cans 40 in the other zones 54b and 54c and then enter the downcomer 28 for delivery to the underlying tray 22.

Desirably, the weirs 54a-c are spaced a preselected distance downstream from the walls 42 of some or all of the cans 40 in the respective zones 56a-c. This spacing between the weirs 54a-c and the cans 40 allows liquid on the deck surface 24 to circulate around the entire perimeter of the cans 40 and enter the can 40 through the inlet openings 50 which are arrayed around the perimeter of the cans 40. In the illustrated embodiment, the weirs 54a-c include hemispheric segments 58 that conform to the exterior shape of the cans 40 so that the weirs 54a-c are spaced a uniform distance from the downstream sides of the cans 40.

The discharge openings 52 that permit liquid to exit through the walls 42 of the cans 40 with a portion of the vapor stream are positioned entirely or predominantly on the downstream side of each can 40 and above the top of the adjacent weir 54a, 54b, or 54c. The discharge openings 52 are constricted so that the liquid exiting the cans 40 through the openings 52 is carried by the vapor stream over the adjacent weir 54a, 54b, or 54c before it descends onto the tray deck 24 in the downstream zone 56b or 56c. As a result, most or all of the liquid exiting each can 40 through the openings 52 is then blocked by the adjacent weir 54b or 54c from being able to recirculate back to the can 40 from which it exited. It will be appreciated that the weirs 54a-c must be spaced sufficiently close to the adjacent cans 40 to allow the exiting liquid to clear the top of the associated weir 54a, 54b, or 54c during its downward descent. At the same time, the weirs 54a-c must be spaced a sufficient distance away from the adjacent cans 40 to allow liquid on the tray deck 24 to circulate around the perimeter of the cans 40.

The weirs 54a-c and the placement of the openings 52 on the downstream sides of the cans 40 serve to reduce the opportunity for liquid exiting a specific can 40 to be recycled to the same can 40 or to other cans 40 in the same zone 56a, 56b, or 56c as the can 40 from which the liquid exited. The liquid is thus able to move in a more uniform manner across the tray deck 24, thereby increasing the mass transfer and/or heat exchange efficiency on the tray deck 24.

Figure 3:
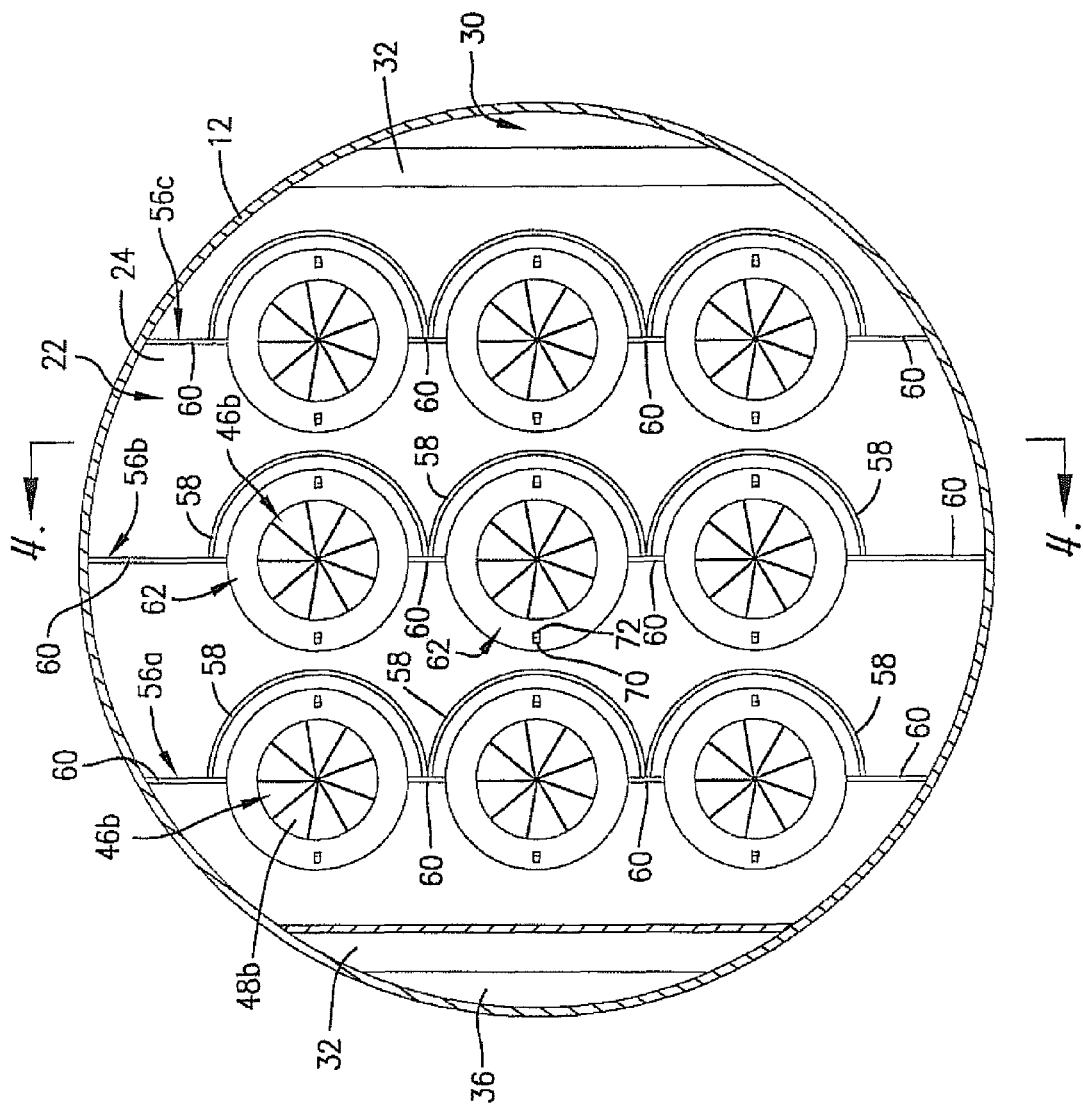
FIG. 3 is a top plan view of the column taken in horizontal section.
Figure 4:
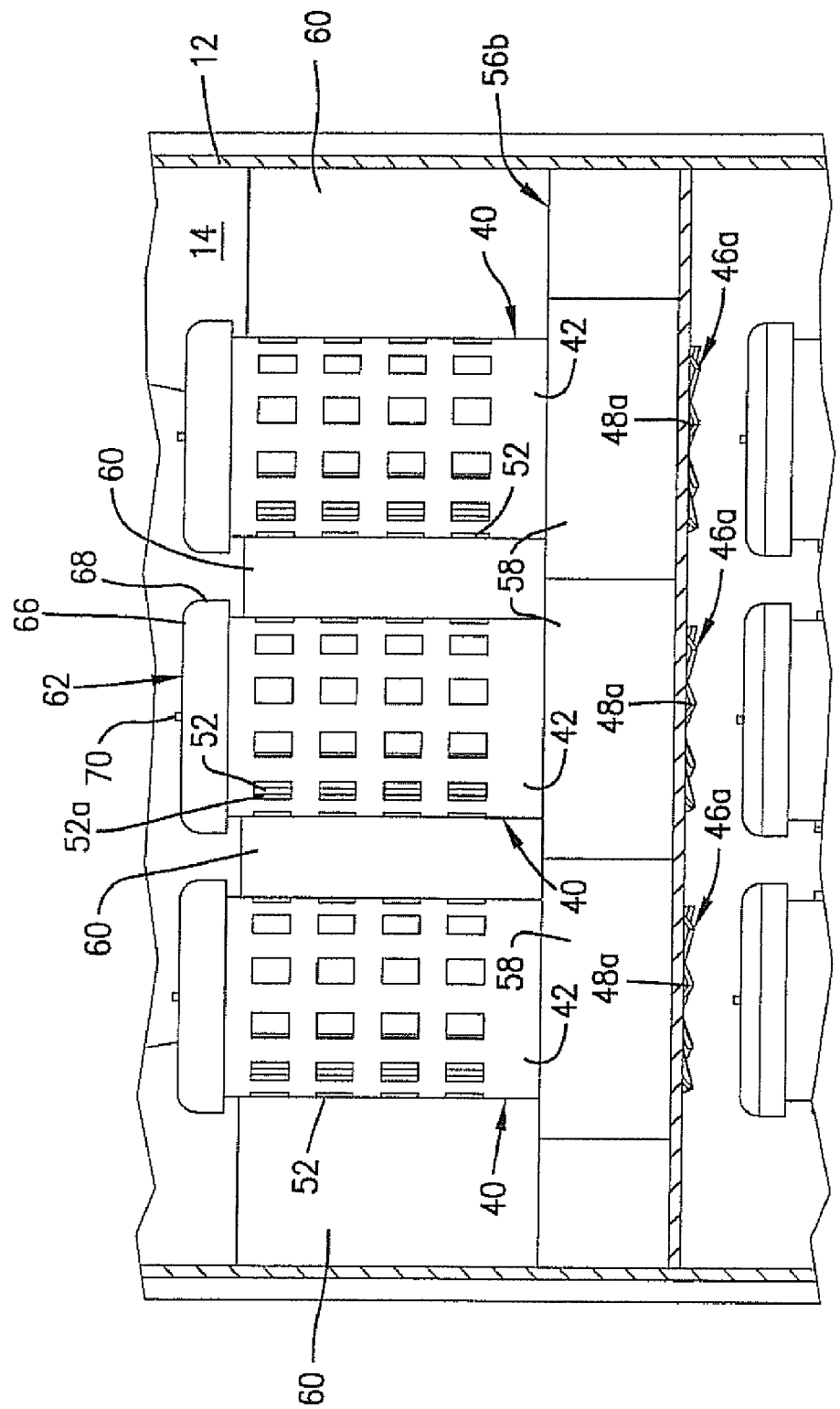
FIG. 4 is a fragmentary front elevation view of the column taken in vertical section along line 4-4 of FIG. 3 in the direction of the arrows.
Figure 5:
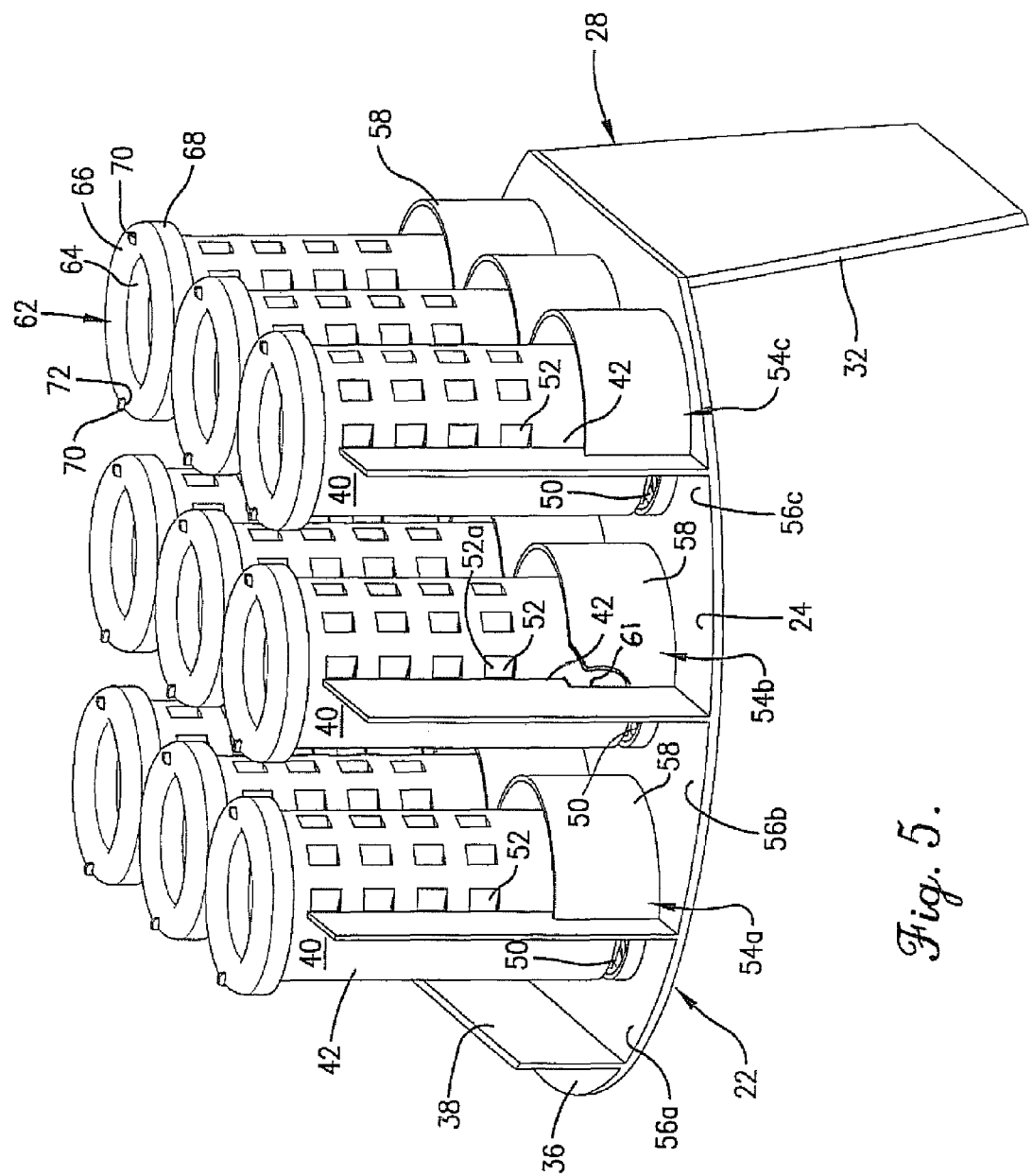
FIG. 5 is a perspective view of one of the cross-flow trays of the present invention.
Figure 6:
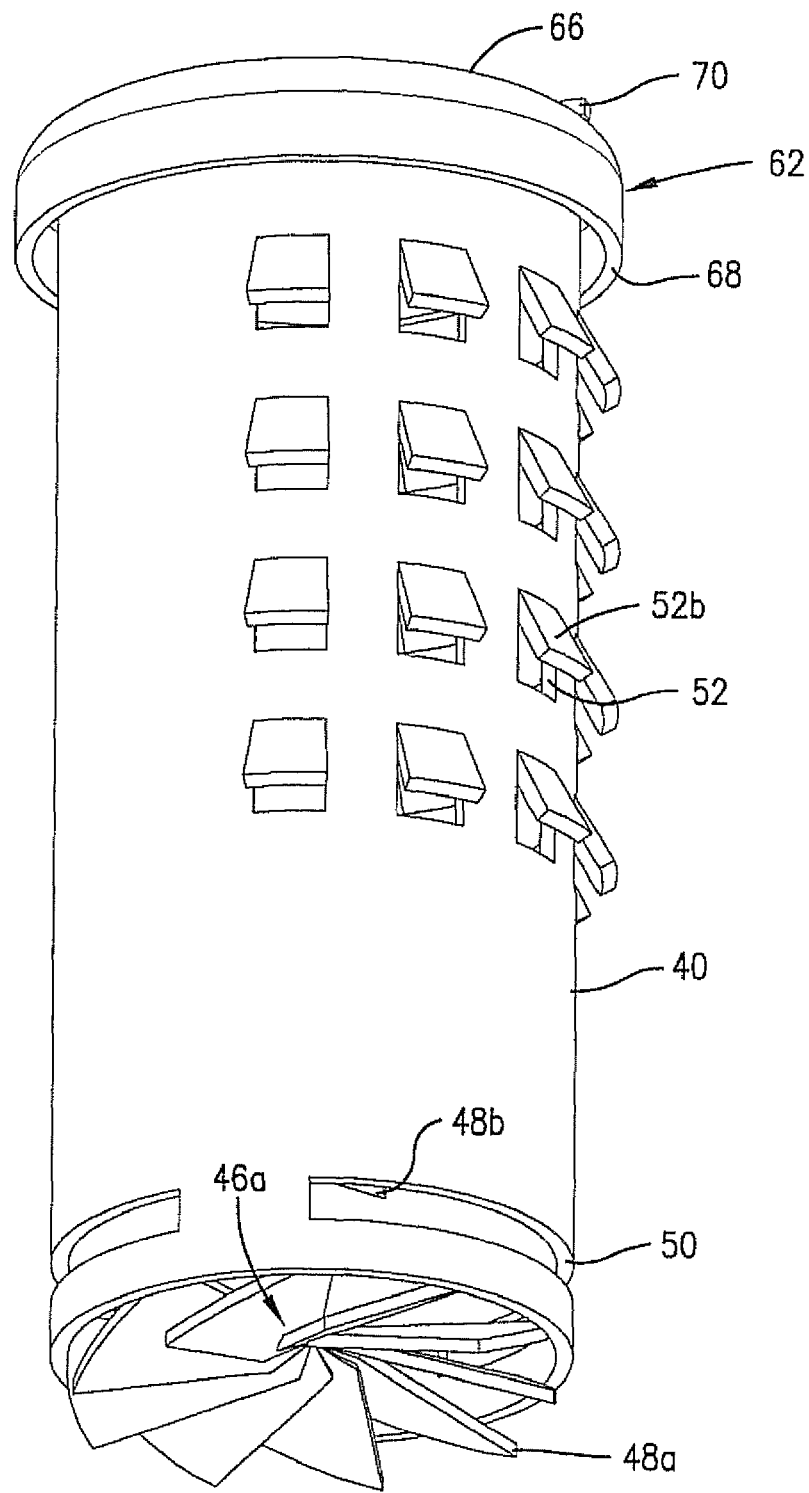
FIG. 6 is a side perspective view of a can used on the cross-flow trays and showing an alternate embodiment of the discharge openings in the wall of the can.

As can best be seen in FIGS. 3 and 4, splash walls 60 extend between laterally adjacent cans 40 within each zone 56a-c and between the shell 12 and the adjacent cans 40 to form a barrier extending generally transverse to the downstream direction of flow of liquid as a further measure to inhibit recirculation of the liquid on and above the tray deck 24. The splash walls 60 have a height approximately the same as that of the cans 40, although a lower height may be used in applications where tray performance is of less concern. Liquid exiting the cans 40 through the discharge openings 52 is blocked by the splash walls 60 from moving in an upstream direction which is opposite from said downstream direction, thereby preventing the liquid from being recirculated to the same can 40 from which it exited or from other cans 40 in the same zone 56a, 56b, or 56c as the can 40 from which the liquid exited. A lower end of each splash wall 60 is positioned above the tray deck 24 or is provided with a cutout 61 (FIG. 5) to allow the liquid on the tray deck 24 to circulate around the entire perimeter of the can 40.

A downturned lip ring 62 is also positioned at the top of each can 40 so that liquid exiting the top of the can 40 along the wall 42 is redirected by the lip ring 62 back toward the tray deck 24. The lip ring 62 has an inner wall 64 that is positioned inwardly of the wall 42 of the associated can 40, a curved upper segment 66 spaced slightly above the top edge of the wall 42, and an outer wall 68 that is positioned outside of the wall 42 of can 40. The ring 62 is held in place by tabs 70 that extend upwardly from the top edge of the wall 42 and are received within slots 72 in the upper segment 64 of the lip ring 60.

During use of the column 10, a liquid stream is introduced onto the inlet area 36 of the tray deck 24 where it accumulates until it reaches a level to overflow the inlet weir 38. The liquid then flows into the first zone 56a where it is presented to the cans 40 located within the zone 56a. Alternatively, the inlet weir 38 may be omitted and the liquid then flows directly from the inlet area 36 into the first zone 56a. The weir 54a cause the liquid to accumulate on the tray deck 24 in the zone 56a until it reaches a height sufficient to enter the cans 40 through the inlet openings 50 in the walls 42 of the cans 40. The liquid entering the cans 40 is picked up by the vapor stream that enters the cans 40 through the vapor openings 44 in the tray deck 24. The swirlers 46 impart a centrifugal swirling motion to the vapor and liquid to cause intimate mixing of the vapor and liquid within the cans 40. The centrifugal forces acting on the liquid cause the liquid to be thrown against the inner surface of the wall 42 where it rises until it encounters the discharge openings 52 in the walls 42. The liquid is carried by a portion of the vapor stream through the discharge openings 52. The momentum of the liquid and vapor stream exiting through the discharge openings 52 is sufficient to carry the liquid over the adjacent weir 54a or 54b and onto the tray deck 24 in the downstream zone 56b or 56c. The remainder of the vapor stream exits through the open top of the can 40 or openings provided in the upper portions of the walls 42 of the can 40 and ascends through the vapor openings 44 in the tray deck 24 of the overlying tray 22. The vapor openings 44 on the overlying tray 22 may be aligned with the cans 40 on the underlying tray 22 so that the vapor can ascend directly into the vapor openings 44 or, alternatively, the vapor openings 44 may be offset from the cans 40 so that the vapor must travel laterally a preselected distance before entering the vapor openings 44. Any liquid that bypasses the discharge openings 52 as it travels up the wall 42 is captured by the lip ring 62 and is redirected downwardly to the tray deck 24.

Liquid that is delivered to the zone 56b accumulates on the tray deck 24 as a result of the weir 54b and enters the cans 40 in the zone 56b through the inlet openings 50 for interaction with the vapor stream in the same fashion described above. Liquid then progresses to the successive zone 56c, and any additional zones that may be provided, in the same manner and then enters the inlet 30 of the downcomer 28 for downward passage to an underlying tray 22.

It can be seen that the weirs 54a-c allow liquid on the tray deck 24 to be sequentially delivered to the groups of cans 40 in each of the multiple zones 56a-c. In this manner, the liquid is sequentially presented to fewer cans 40, thereby reducing the opportunity for undesirable entrainment of the liquid in the vapor stream, particularly at low liquid flow rates. The weirs 54a-c, in combination with the discharge openings 52 being positioned predominately or entirely on the downstream sides of the cans 40, also reduce the opportunity for liquid to be recirculated to the cans 40, thereby ensuring a more plug-like flow of the liquid across the tray and more efficient mass transfer and/or heat exchange between the liquid and vapor on the tray deck 24.

Since many possible embodiments may be made of the invention without departing from the scope thereof, it is to be understood that all matter herein set forth or shown in the accompany drawings is to be interpreted as illustrative and not in a limiting sense.

Having thus described the invention, what is claimed is:

1. A cross-flow tray for use in a column to facilitate mass transfer and/or heat exchange between fluid streams in said column, said tray comprising:

a generally planar tray deck;

an inlet area positioned on said tray deck where liquid is to be introduced onto said tray deck;

a downcomer having an inlet opening on said tray deck for removing liquid from said tray deck after it flows in a downstream direction along said tray deck from said inlet area;

a plurality of vapor openings in said tray deck for allowing the passage of vapor upwardly through said tray deck through said openings;

a plurality of cans positioned on said tray deck and having walls surrounding said vapor openings so that said vapor passing through the tray deck rises within said cans, wherein a first group of said cans is positioned in a first zone on said tray deck and a second group of said cans is positioned in a second zone on said tray deck, said second zone being located in said downstream direction from said first zone;

swirlers positioned to impart a swirling motion to said vapor rising within said cans;

inlet openings in said walls of said cans for allowing liquid to enter said cans from the tray deck;

discharge openings positioned above said inlet openings in said walls of said cans to permit liquid to exit said cans after interacting with said vapor rising with a swirling motion within the cans; and a weir positioned between said first group of said cans in the first zone on said tray deck and said second group of said cans in the second zone on said tray deck.

2. The cross-flow tray of claim 1, wherein said weir includes hemispheric segments that conform to an exterior shape of said cans and are spaced a uniform distance from said cans in said downstream direction to allow liquid on said tray deck to circulate around said cans.

3. The cross-flow tray of claim 2, wherein said weir has an upper edge positioned at a level above said inlet openings in said walls of the cans.

4. The cross-flow tray of claim 3, wherein said upper edge of the weir is positioned at a level below the discharge openings in said walls of the cans.

5. The cross-flow tray of claim 1, wherein a same number of cans is present in said first group of cans and in said second group of cans.

6. The cross-flow tray of claim 1, wherein a different number of cans is present in said first group of cans and in said second group of cans.

7. The cross-flow tray of claim 1, wherein said discharge openings are positioned predominantly or entirely on a downstream side of said cans in said first group of cans facing in said downstream direction so that liquid exiting said cans through said discharge openings is carried in said downstream direction over said weir before returning to said tray deck.

8. The cross-flow tray of claim 7, including a second one of said weirs positioned in said downstream direction from the second group of said cans in said second zone.

9. The cross-flow tray of claim 8, wherein said discharge openings are positioned predominantly or entirely on a downstream side of said cans in said second group of cans facing in said downstream direction so that liquid exiting said cans through said discharge openings is carried in said downstream direction over said second weir before returning to said tray deck.

10. The cross-flow tray of claim 1, including splash walls extending between adjacent cans to block said liquid exiting said cans through said discharge openings from being carried in an upstream direction opposite from said downstream direction.

11. The cross-flow tray of claim 10, wherein said splash walls have a height approximately the same as that of the cans.

12. A column for facilitating mass transfer and/or heat exchange between fluid streams in said column, said column comprising:
an upright shell defining an open interior region;
a plurality of cross-flow trays positioned in vertically spaced apart relationship in said open interior region of said shell, each of said cross-flow trays comprising:
a generally planar tray deck;
an inlet area positioned on said tray deck where liquid is to be introduced onto said tray deck;
a downcomer having an inlet opening on said tray deck for removing liquid from said tray deck after it flows in a downstream direction along said tray deck from said inlet area;
a plurality of vapor openings in said tray deck for allowing the passage of vapor upwardly through said tray deck through said openings;
a plurality of cans positioned on said tray deck and having walls surrounding said vapor openings so that said vapor passing through the tray deck rises within said cans, wherein a first group of said cans is positioned in a first zone on said tray deck and a second group of said cans is positioned in a second zone on said tray deck, said second zone being located in said downstream direction from said first zone;
swirlers positioned to impart a swirling motion to said vapor rising within said cans;
inlet openings in said walls of said cans for allowing liquid to enter said cans from the tray deck;
discharge openings positioned above said inlet openings in said walls of said cans to permit liquid to exit said cans after interacting with said vapor rising with a swirling motion within the cans; and
a weir positioned between said first group of said cans in the first zone on said tray deck and said second group of said cans in the second zone on said tray deck.

13. The column of claim 12, wherein said weir includes hemispheric segments that conform to an exterior shape of said cans and are spaced a uniform distance from said cans in said downstream direction to allow liquid on said tray deck to circulate around said cans.

14. The column of claim 13, wherein said weir has an upper edge positioned at a level above said inlet openings in said walls of the cans.

15. The column of claim 14, wherein said upper edge of the weir is positioned at a level below the discharge openings in said walls of the cans.

16. The column of claim 12, wherein a same number of cans is present in said first group of cans and in said second group of cans.

17. The column of claim 12, wherein a different number of cans is present in said first group of cans and in said second group of cans.

18. The column of claim 12, wherein said discharge openings are positioned predominantly or entirely on a downstream side of said cans in said first group of cans facing in said downstream direction so that liquid exiting said cans through said discharge openings is carried in said downstream direction over said weir before returning to said tray deck.

19. The column of claim 18, including a second one of said weirs positioned in said downstream direction from the second group of said cans in said second zone.

20. The column of claim 19, wherein said discharge openings are positioned predominantly or entirely on a downstream side of said cans in said second group of cans facing in said downstream direction so that liquid exiting said cans through said discharge openings is carried in said downstream direction over said second weir before returning to said tray deck.

21. The column of claim 12, including splash walls extending between adjacent cans to block said liquid exiting said cans through said discharge openings from being carried in an upstream direction opposite from said downstream direction.

22. The column of claim 21, wherein said splash walls have a height approximately the same as that of the cans.

23. A method of facilitating interaction of vapor and liquid within a column containing a plurality of cross-flow trays positioned in vertically spaced-apart relationship within an open internal region of said column, each of said cross-flow trays having a tray deck on which a plurality of cans are positioned, said cans having walls that surrounding vapor openings in the tray deck, wherein a first group of said cans is positioned in a first zone on said tray deck and a second group of said cans is positioned in a second zone on said tray deck, said second zone being located in said downstream direction from said first zone, and wherein a weir is positioned between said first group of said cans in the first zone on said tray deck and said second group of said cans in the second zone on said tray deck, said method comprising the steps of:

introducing liquid onto an inlet area of said tray deck and causing said liquid to flow in a downstream direction on said tray deck;

using said weir to accumulate said liquid on the tray deck in said first zone until it reaches a level sufficient to enter the first group of cans in the first zone through inlet openings provided in the walls of said first group of cans;

mixing the liquid entering said first group of cans with vapor rising within said cans with a swirling motion to cause mass and/or heat transfer between the liquid and the vapor;

directing liquid that has mixed with the vapor within said first group of cans through discharge openings provided in the walls of the first group of cans, said discharge openings being positioned to direct said liquid over the weir and onto the tray deck in said second zone;

accumulating said liquid on the tray deck in said second zone until it reaches a level sufficient to enter the second group of cans in the second zone through inlet openings provided in the walls of said second group of cans;

mixing the liquid entering said second group of cans with vapor rising within said cans with a swirling motion; and removing liquid that has mixed with the vapor within said second group of cans through discharge openings provided in the walls of the second group of cans.

24. The method of claim 23, including the step of directing liquid that has mixed with the vapor within said second group of cans through discharge openings provided in the walls of the second group of cans, said discharge openings being positioned to direct said liquid in said downstream direction.

25. The method of claim 24, including the steps of delivering the vapor from said cans on one of said cross-flow trays to an overlying one of said cross-flow tray and delivering the liquid discharged from said second group of cans on said one cross-flow tray to an underlying one of said cross-flow trays.

* * * * *